United States Patent
Ali et al.

(10) Patent No.: US 12,350,989 B2
(45) Date of Patent: Jul. 8, 2025

(54) VEHICLE ACTIVE SUSPENSION CONTROL SYSTEM AND METHOD

(71) Applicant: JAGUAR LAND ROVER LIMITED, Coventry (GB)

(72) Inventors: Syed Asad Ali, Coventry (GB); Luke Birch, Mickleton (GB); Dennis Lausecker, Coventry (GB); Jim Kelly, Solihull (GB); Jonathan Larsson, Hinckley (GB); William Burdock, Sutton Coldfield (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 212 days.

(21) Appl. No.: 18/017,445

(22) PCT Filed: Jul. 21, 2021

(86) PCT No.: PCT/EP2021/070446
§ 371 (c)(1),
(2) Date: Jan. 23, 2023

(87) PCT Pub. No.: WO2022/018166
PCT Pub. Date: Jan. 27, 2022

(65) Prior Publication Data
US 2023/0294473 A1    Sep. 21, 2023

(30) Foreign Application Priority Data
Jul. 21, 2020 (GB) ..................... 2011269

(51) Int. Cl.
*B60G 17/0165* (2006.01)
*B60G 17/016* (2006.01)

(52) U.S. Cl.
CPC ..... *B60G 17/0165* (2013.01); *B60G 17/0161* (2013.01); *B60G 2400/0512* (2013.01);
(Continued)

(58) Field of Classification Search
CPC ............ B60G 17/0165; B60G 17/0161; B60G 2400/0512; B60G 2400/204;
(Continued)

(56) References Cited

U.S. PATENT DOCUMENTS 4,948,166 A    8/1990  Kaneko
5,530,648 A    6/1996  Lavey
(Continued)

FOREIGN PATENT DOCUMENTS

CN    209290104 U    8/2019
EP    3159195 A1    4/2017
(Continued)

OTHER PUBLICATIONS

English summary of Japanese Notice of Reasons for Rejection corresponding to application 2023-504454, dated Feb. 1, 2024, 3 pages.
(Continued)

*Primary Examiner* — George C Jin
(74) *Attorney, Agent, or Firm* — Troutman Pepper Locke LLP; Dustin B. Weeks; Nicholas H. Doss (57) ABSTRACT

Aspects of the present invention relate to a method and to a control system for controlling an active suspension of a vehicle, the control system comprising one or more controllers, the control system configured to: obtain information indicative of a change of gradient of a driving surface in a direction of travel; and control the active suspension to adjust relative ride height between a front and rear of a vehicle body of the vehicle above the driving surface beneath the vehicle in dependence on the change of gradient.

15 Claims, 6 Drawing Sheets

(52) U.S. Cl.
CPC .. *B60G 2400/204* (2013.01); *B60G 2400/824* (2013.01); *B60G 2500/30* (2013.01); *B60G 2800/0192* (2013.01); *B60G 2800/914* (2013.01)

(58) Field of Classification Search
CPC .......... B60G 2400/824; B60G 2500/30; B60G 2800/0192; B60G 2800/914
See application file for complete search history.

(56) References Cited

U.S. PATENT DOCUMENTS

| | | | | |
|---|---|---|---|---|
| 5,684,698 | A | * | 11/1997 | Fujii .................... B60G 17/018 180/41 |
| 6,085,133 | A | | 7/2000 | Keuper et al. |
| 9,963,007 | B2 | | 5/2018 | Unger et al. |
| 2010/0152969 | A1 | | 6/2010 | Li et al. |
| 2019/0061458 | A1 | | 2/2019 | Tanaka et al. |
| 2020/0393330 | A1 | * | 12/2020 | Zhao .................. B60G 17/0161 |

FOREIGN PATENT DOCUMENTS

| | | | |
|---|---|---|---|
| JP | S6274705 | A | 4/1987 |
| JP | H01101213 | A | 4/1989 |
| JP | H10297238 | A | 11/1998 |
| JP | 2017094970 | A * | 6/2017 |
| WO | 2016134811 | A1 | 9/2016 |

OTHER PUBLICATIONS

Combined Search and Examination Report for Application No. GB2011269.4, dated Dec. 16, 2020, 5 pages.
International Search Report and Written Opinion for Application No. PCT/EP2021/070446, dated Nov. 5, 2021, 14 pages.
Great Britain Examination Report under Section 18(3) corresponding to Application No. GB2011269.4, dated Nov. 18, 2022, 3 pages.
Combined Search and Examination Report for Application No. GB1910230.0, dated Dec. 9, 2019, 6 pages.

* cited by examiner

VEHICLE ACTIVE SUSPENSION CONTROL SYSTEM AND METHOD

TECHNICAL FIELD

The present disclosure relates to a vehicle active suspension control system and method. In particular, but not exclusively it relates to a vehicle active suspension control system and method in a road vehicle.

BACKGROUND

Active suspensions for vehicles are known. Active suspensions include hydraulically actuated suspensions, electronically actuated hydraulic suspensions, pneumatic suspensions, and electromagnetic suspensions. An active suspension may comprise an active damper (shock absorber) and/or may comprise an active spring. Active suspensions have the advantage that spring force and/or damper force can be varied in use using a control system. This enables an adaptive compromise between comfort and improved road handling.

SUMMARY OF THE INVENTION

It is an aim of the present invention to address one or more of the disadvantages associated with the prior art.

Aspects and embodiments of the invention provide a control system, a method, a vehicle, and computer software as claimed in the appended claims.

According to an aspect of the invention there is provided a control system for controlling an active suspension of a vehicle, the control system comprising one or more controllers, the control system configured to: obtain information indicative of a change of gradient of a driving surface in a direction of travel; and control the active suspension to control relative ride height between a front and rear of a vehicle body of the vehicle above the driving surface beneath the vehicle in dependence on the change of gradient.

An advantage is improved vehicle body control, enabling visibility and/or comfort to be improved. The link between front-rear relative ride height (also called 'pitch angle' or 'attitude') control and a detected change of driving surface gradient (also called 'transition') in the direction of travel, enables function(s) such as smoothing gradient transitions to reduce head toss, and/or 'peeking' over blind gradient changes to ensure that the road ahead is not occluded from the drivers view by a bumper or other part of the vehicle.

In some examples, the control system is configured to obtain a target adjustment for causing a deviation of pitch angle between the vehicle body and an angle of the driving surface beneath the vehicle, and wherein the control of relative ride height between the front and rear of the vehicle body is towards the target adjustment. An advantage of this 'Angle Control' is improved vehicle body control because the vehicle body can be moved towards a desired pitch angle and/or kept at a desired pitch angle as the gradient changes.

In some examples, the target adjustment is at or towards a horizontal horizon. An advantage is improved comfort because the vehicle maintains/targets a horizontal attitude (within suspension adjustability limits) through the transition, reducing occupant head toss and providing a stable platform especially for unseated passengers.

In some examples, the control system is configured to commence the control of the relative ride height between the front and rear of the vehicle body towards the target adjustment before the vehicle reaches the change of gradient. An advantage is enabling improved visibility, in this case via predictive control. For example, visibility can be improved by peeking over a blind transition such as a crest before reaching the crest. Comfort could be improved too by adopting a desired attitude.

In some examples, the control system is configured to control the relative ride height towards the target adjustment during, and optionally for a period after, travel of the vehicle over the change of gradient. An advantage is enabling improved comfort, which in this case may be via reactive control. For example, the vehicle could maintain a desired attitude (e.g. horizontal horizon) through the transition, and then gradually migrate back towards a standard pitch angle.

In some examples, the control system is configured to enable pitch angle of the vehicle body to commence returning towards an angle of a driving surface beneath the vehicle after having deviated the pitch angle of the vehicle body towards the target adjustment. An advantage is improved comfort and/or visibility, by enabling the vehicle to return to a surface-parallel attitude after the transition.

In some examples, the control of relative ride height comprises controlling a rate at which the relative ride height between the front and rear of the vehicle body changes towards an angle of a driving surface beneath the vehicle. An advantage of this 'Rate Control' is enabling improved comfort by enabling an increase of the time interval over which the pitch angle changes. The reduced rate of change of pitch angle reduces occupant head toss.

In some examples, the control system is configured to obtain an indication of a length of the driving surface after the change of gradient and before a second change of gradient, and determine whether or not to perform the control of the active suspension, in dependence on at least the length. In some examples, the control system is configured to obtain an indication of a speed of the vehicle associated with the change of gradient, and wherein the determination of whether or not to perform the control of the active suspension is dependent on the speed. An advantage is enabling improved comfort by ensuring there is sufficient time to perform the control, which may be difficult if multiple gradient changes occur in close succession.

In some examples, the control system is configured to obtain an indication of whether the change of gradient is positive or negative relative to a reference, and wherein the control of relative ride height is dependent on whether the change of gradient is positive or negative. An advantage is improved comfort because the human body responds differently to positive and negative changes of gradient, so the control can be optimised accordingly.

In some examples, the control of relative ride height comprises: a) raising the rear and/or lowering the front of the vehicle body above the driving surface when the change is a positive change of gradient from a non-negative gradient; and/or b) lowering the rear and/or raising the front of the vehicle body above the driving surface when the change is a positive change of gradient from a negative gradient. An advantage is improved comfort because the vehicle provides a more horizontal platform for upward changes of gradient.

In some examples, the control system is configured to: receive a request to modify relative ride height between the front and rear of the vehicle body; and control the active suspension to modify the relative ride height in response to the request, comprising lowering the front of the vehicle body, or raising the rear of the vehicle body, or raising the front and the rear of the vehicle body by different distances. An advantage is improved visibility because the vehicle can rise to 'peek' over a crest (or look uphill from a dip), helping to reveal obstacles after the crest or dip that may be occluded.

In some examples, the request is generated in dependence on change of a mode of the vehicle to one of a plurality of modes, wherein different ones of the plurality of modes configure one or more vehicle subsystems differently, and/or wherein the request is a user request.

In some examples, the control of relative ride height comprises raising the rear and/or lowering the front of the vehicle body when the direction of travel is a first direction of travel associated with the front of the vehicle body reaching the change of gradient of the driving surface before the rear of the vehicle body. An advantage is that the vehicle provides a horizontal platform for positive gradient changes, and/or visibility over crests or plateaus is improved.

In some examples, the control of relative ride height comprises lowering the rear and/or raising the front of the vehicle body when the direction of travel is a second direction of travel, such as reverse, opposite the first direction of travel associated with the rear of the vehicle body reaching the change of gradient of the driving surface before the front of the vehicle body. An advantage is that the vehicle can adapt to whether it is driving forward or in reverse.

In some examples, the information indicative of a change of gradient is from a crest detection system configured to detect crests in a path of the vehicle.

In some examples, the information indicative of a change of gradient comprises feedback information, feedforward information, or a combination thereof.

In some examples, the control system may be configured to: obtain information indicative of a relative displacement between the active suspension and a suspension travel limit; and modify the control of the active suspension to inhibit further displacement of the active suspension towards the suspension travel limit, in dependence on the information indicative of the relative displacement.

In some examples, the control system may be configured to: obtain information indicative of rough ground and/or an obstacle external to the vehicle; and inhibit the control of the active suspension in dependence on the information indicative of rough ground and/or the obstacle.

According to another aspect of the invention there is provided a vehicle comprising the control system.

In some examples, the vehicle is configured for autonomous driving.

In some examples, the vehicle is a shared mobility vehicle.

According to another aspect of the invention there is provided a method of controlling an active suspension of a vehicle, the method comprising: obtaining information indicative of a change of gradient of a driving surface in a direction of travel; and controlling the active suspension to control relative ride height between a front and rear of a vehicle body of the vehicle above the driving surface beneath the vehicle in dependence on the change of gradient.

According to another aspect of the invention there is provided computer software that, when executed, is arranged to perform any one or more of the methods described herein. According to another aspect of the present invention, there is provided a non-transitory computer-readable storage medium comprising the computer software.

According to another aspect of the present invention, there is provided a control system configured to perform any one or more of the methods described herein.

In some examples, the one or more controllers collectively comprise: at least one electronic processor having an electrical input for receiving the information indicative of a change of gradient; and at least one electronic memory device electrically coupled to the at least one electronic processor and having instructions stored therein; and wherein the at least one electronic processor is configured to access the at least one memory device and execute the instructions thereon so as to cause the control system to control the active suspension in dependence on the information.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
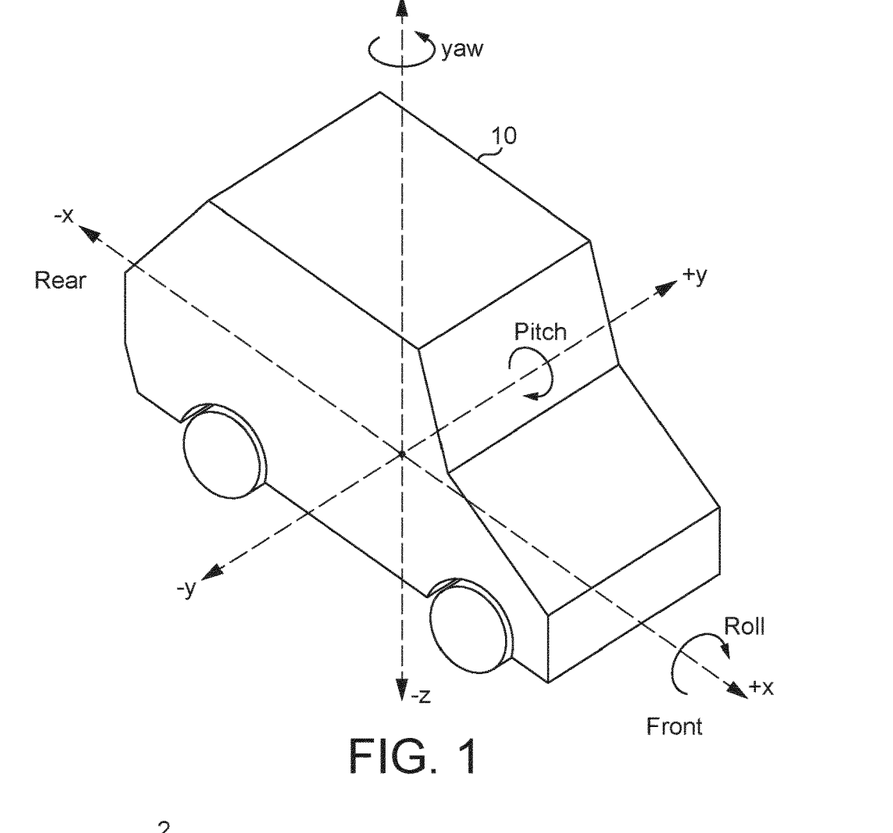
FIG. 1 illustrates an example of a vehicle.

FIG. 1 illustrates an example of a road vehicle 10 ('Vehicle' herein) in which embodiments of the invention can be implemented. In some, but not necessarily all examples, the vehicle 10 is a passenger vehicle, also referred to as a passenger car or as an automobile. In other examples, the vehicle 10 may be a cargo vehicle such as a van. Passenger cars and vans generally have kerb weights of less than 5000 kg. Passenger cars and vans generally have lengths of less than 7 metres. In other examples, embodiments of the invention can be implemented for other applications, such as industrial vehicles.

FIG. 1 also illustrates an on-vehicle 3D coordinate system defining three perpendicular axes and Euler angles. The coordinate system comprises a longitudinal x-axis. The vehicle 10 is configured to drive in the positive x-direction (positive acceleration) and reverse in the negative x-direction (negative acceleration=deceleration). The x-axis also defines an axis of roll.

The coordinate system comprises a lateral, transverse y-axis. The vehicle 10 is configured to steer while in motion, to impose lateral acceleration in the y-axis. The vehicle 10 is configured to steer left in the positive y-direction and to steer right in the negative y-direction. The y-axis also defines an axis of pitch. The vehicle 10 may be configured for front-wheel steering, rear-wheel steering, or four-wheel steering. The vehicle 10 may be configured to traverse using rack-and-pinion steering/Ackermann steering, etc. In some examples, the vehicle 10 may be configured to traverse by steering yaw (e.g. sideslip, crabbing) of the vehicle 10.

The coordinate system comprises a vertical z-axis. A ride height of the vehicle 10 increases in the positive z-direction and decreases in the negative z-direction. Vehicle heave is movement in the z-axis. The z-axis also defines an axis of yaw.

Figure 2A:
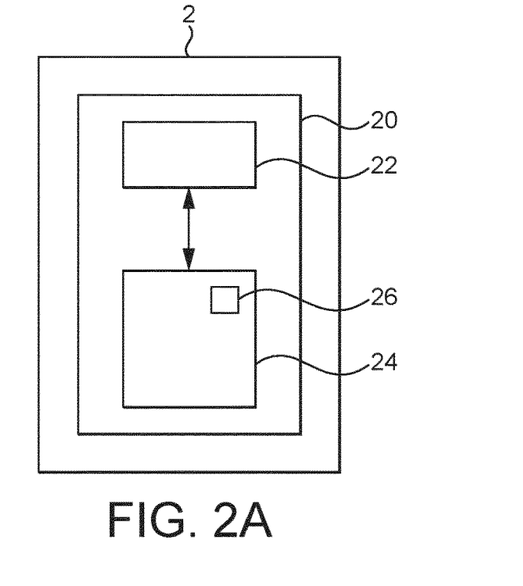
FIG. 2A illustrates an example of a control system and FIG. 2B illustrates an example of a non-transitory computer-readable medium.

FIG. 2A illustrates a control system 2. The control system 2 comprises one or more controllers. One controller 20 is shown, as an example.

The controller 20 of FIG. 2A includes at least one electronic processor 22; and at least one electronic memory device 24 electrically coupled to the electronic processor 22 and having instructions 26 (e.g. a computer program) stored therein, the at least one electronic memory device 24 and the instructions 26 configured to, with the at least one electronic processor 22, cause any one or more of the methods described herein to be performed. An example controller 20 of the control system 2 is an active suspension controller, for controlling an actuator of the active suspension.

Figure 2B:
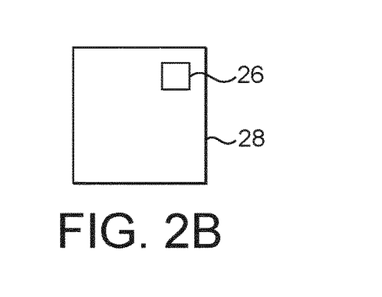

FIG. 2B illustrates a non-transitory computer-readable storage medium 28 comprising the instructions 26 (computer software).

Figure 3:
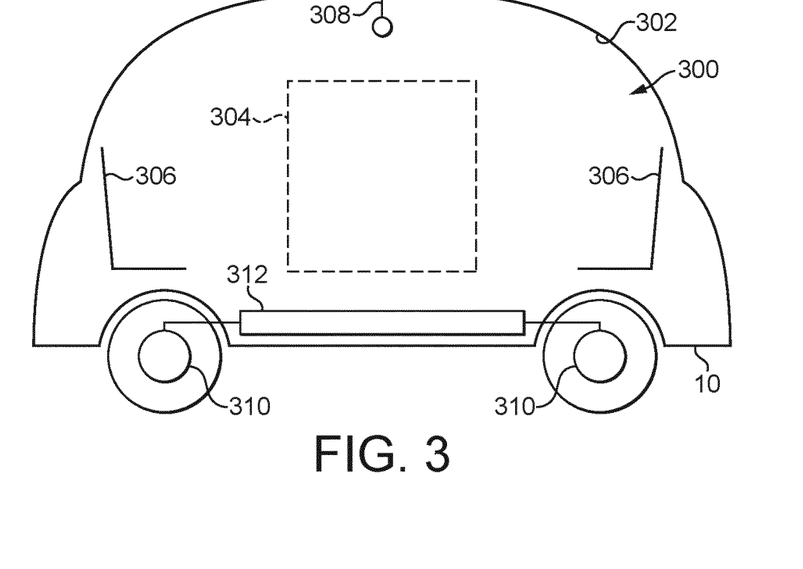
FIG. 3 illustrates an example of a cabin of a vehicle.

FIG. 3 illustrates an example of a vehicle 10, showing its cabin 300 and a powertrain. The illustrated cabin 300 comprises the interior of the vehicle 10 at least partially enclosed by a vehicle body 302 of the vehicle 10. The cabin 300 is accessible from at least one door 304. The door 304 may be a sliding door or a swinging door.

The cabin 300 enables passengers to stand and/or sit in various ways. It would be desirable to ensure that passenger head accelerations are minimised regardless of whether passengers stand or sit, and regardless of where the passengers are located in the cabin 300. Passenger head acceleration is linked to passenger stability and comfort because the human vestibular system is controlled from the inner ear in the head.

The cabin 300 comprises passenger seats 306 for sitting passengers. The cabin 300 may comprise handles 308 for standing passengers. The handles 308 may be grab handles. The grab handles 308 for standing passengers may be located in areas not reachable from seats 306. Standing passengers are more easily unbalanced by unexpected vehicle motions than sitting passengers.

In the illustration, at least one passenger seat 306 is facing a different direction from at least one other passenger seat 306. The illustrated seats 306 are facing in opposite directions. This seating arrangement enables more interior legroom and luggage room, and more personal space for passengers unfamiliar with each other. However, passengers not directly facing a direction of travel of the vehicle 10 are more likely to experience motion sickness and/or are less able to anticipate vehicle motions.

FIG. 3 shows a layout in which at least one seat 306 or row of seats 306 is located above an axle of the vehicle 10. An axle corresponds to a pair of laterally separated wheels in this example. Passengers located above or overhanging the axles experience greater heave (z-axis translation) from vehicle suspension movements, than passengers located within a wheelbase of the vehicle 10.

The illustrated cabin arrangement is one example of many possible cabin arrangements.

In an alternative example, the vehicle 10 is a cargo vehicle. The cabin 300 may comprise fewer seats, or no passenger seats if the vehicle 10 is an autonomous vehicle. Some cargo may be fragile and sensitive to excessive cabin accelerations.

In some examples, the vehicle 10 of FIG. 3 may be a shared mobility vehicle. A shared mobility vehicle may comprise a billing module (not shown) for determining a bill for a journey, in dependence on automatic monitoring of time and/or distance. If the vehicle is driverless, customer payments may be processed via an onboard payment terminal and/or via automatic (e.g. geofence-triggered) communication with an external server managing a user account and payments (e.g. ride-hailing app). The billing module may issue tickets or receipts via an onboard printer and/or may issue tickets or receipts via the automatic communication.

In some, but not necessarily all examples, the shared mobility vehicle may be implemented as a pod. A pod is defined herein as a shared mobility vehicle configured for limited occupancy compared to a bus or train, and comprising three or more vehicle wheels. For example, a pod may have space for between one and six occupants depending on implementation. The pod may comprise between one and six seats. The pod may be configured for driving in pedestrianised areas up to a predetermined maximum speed appropriate for a vehicle operating in a pedestrianised area. The pod may be configured for on-road driving at or greater than the predetermined maximum speed.

According to FIG. 3, but not necessarily in all examples, the vehicle 10 comprises a traction battery 312 and electric traction motor(s) 310. The vehicle 10 may therefore be a fully electric vehicle (EV) or a hybrid electric vehicle (HEV). In other examples, the vehicle 10 may comprise an internal combustion engine or other torque source. The vehicle 10 may even be gravity driven and may lack a torque source. In some, but not necessarily all examples, the vehicle 10 may be a non-road vehicle, such as a rail vehicle, a magnetic levitation vehicle, etc.

Figure 4:
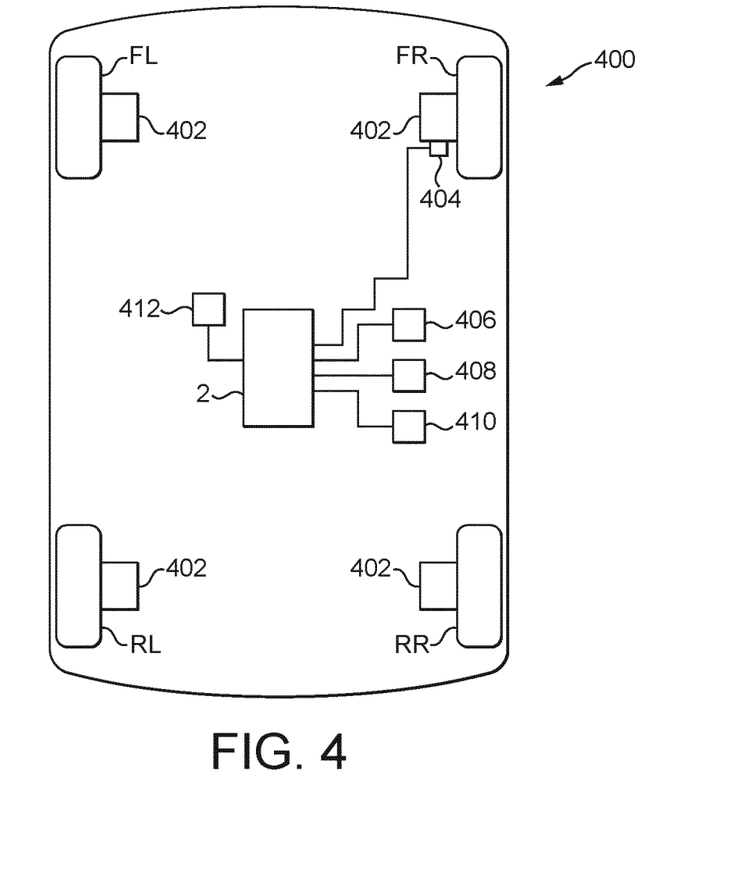
FIG. 4 illustrates an example of a system for a vehicle.

FIG. 4 illustrates a system 400 comprising control system 2, sensors, interfaces and actuators of a vehicle 10. The vehicle 10 may be the vehicle 10 of FIGS. 1 and 3.

The vehicle 10 comprises an active suspension 402, an example of which is shown in FIG. 4. The active suspension 402 may be configured for active damping. The active damping may be controlled using a pump-controlled hydraulic circuit or equivalent. Bump force and/or rebound force may be individually controllable.

The active suspension 402 may be configured for active spring control. The active spring control may be controlled using a pump-controlled pneumatic system, or equivalent. Spring force (spring rate) may be controllable. Ride height of the vehicle body 302 above a prevailing driving surface may be controllable. The active suspension 402 may be configured for active force control, independent of wheel-to-body motion. The active force control may be controlled using a pump-controlled hydraulic system, or equivalent. Active force may induce motion between the vehicle body 302 and suspension, or may inhibit motion between the body and suspension. The active suspension 402 may enable active roll control and/or active pitch control, at one or more axles.

The active suspension 402 may be controlled by the control system 2, optionally via a further low-level controller. In some, but not necessarily all examples, the active suspension 402 may be controlled using a variable force parameter. The variable force parameter controls the extent to which the active suspension 402 controls cabin/body movement of the vehicle 10. The variable force parameter may be a force demand (gain). The force demand may comprise a spring force demand for controlling a force applied to the active springs that is resisted by the spring's stiffness, and/or the force demand may comprise a damping force demand for controlling bump force and/or rebound force, and/or the force demand may comprise an active force for controlling the body independent of wheel-to-body motion. Control of a suspension fluid pump and/or flow restrictor (damping) may be dependent on the force demand. Increasing the force demand increases the spring force and/or the damping force and/or the active force, resulting in a 'stiffer' suspension when required. One force demand may control an active suspension setting for a plurality of vehicle wheels, or for one vehicle wheel.

The force demand may be a function of detected cabin motion. Detecting cabin motion may comprise monitoring inertial signals indicative of cabin motion, such as roll and/or pitch and/or heave.

The above force demand may be a negotiated force demand dependent on a plurality of individual force demands requested by a plurality of controllers. The plurality of controllers may comprise predictive controllers and reactive controllers. The controllers may comprise a skyhook controller and/or a groundhook controller. The negotiated (arbitrated) force demand may be calculated by blending the individual force demands, for instance based on addition, priority and/or averaging.

A skyhook controller relies on the skyhook control policy for reducing the motion of a sprung mass as it is disturbed. The skyhook control policy assumes that the modelled damper is fixed to the sky. A groundhook controller relies on the groundhook control policy for reducing the motion of an unsprung mass as it is disturbed. The groundhook control policy assumes that the modelled damper is fixed to an unsprung mass rather than a sprung mass. A hybrid system can be implemented by combining skyhook and groundhook controllers.

The active suspension 402 of the system 400 of FIG. 4 comprises one or more active components per vehicle wheel FL, FR, RL, RR such as an active damper and/or an active spring and/or active force device. The active suspension 402 may be a semi-active suspension with an active damper and passive spring or an active spring and passive damper. Sub-systems of the active suspension 402 are not shown, and can provided in any suitable arrangement for achieving the required control of the active suspension 402, required by one or more of the methods described herein. For example, the ride height of the front of the vehicle body above a prevailing driving surface may be changed by controlling the active suspension components at the front wheels FL, FR. The ride height of the rear of the vehicle body above a prevailing driving surface may be changed by controlling the active suspension components at the rear wheels RL, RR.

The vehicle 10 may be an autonomous vehicle. The vehicle 10 may be a fully autonomous vehicle. A fully autonomous vehicle 10 is a driverless vehicle configured for autonomous-only driving. A fully autonomous vehicle 10 may lack an accelerator pedal, a brake pedal and/or a steering wheel. Therefore, a fully autonomous vehicle may lack a recognisable drivers seat. The vehicle may be configured for Level 5 automated driving, as defined in the Society of Automotive Engineers (SAE) Standard J3016.

Alternatively, the vehicle 10 may comprise a lower level autonomous driving mode for at least one driving task (steering/acceleration/braking) and a non-autonomous driving mode.

The control system 2 is configured to receive sensor-dependent information directly or indirectly from sensors, enabling the control system 2 to control the active suspension 402 based on a current vehicle context. FIG. 4 illustrates example sensors which are referred to by the methods described herein, including:

An inertial measurement unit (IMU 408). The IMU 408 provides an indication of the vehicle body/cabin motion. For example, the IMU 408 may indicate roll, pitch and/or heave.

At least one cabin sensor 410. Cabin sensors 410 may provide an indication of vehicle occupancy and/or occupant behaviour. Cabin sensors 410 may comprise at least one of: cabin cameras for imaging vehicle occupants in the cabin 300; seatbelt sensors for detecting whether a seatbelt is fastened; seat weight/seat occupancy sensors for detecting whether a seat is occupied, etc.

At least one localization sensor 406. Localization sensors 406 provide information enabling an autonomous vehicle controller (not shown) to localize the vehicle 10 within a driving environment. The autonomous vehicle controller therefore plans vehicle manoeuvres of the vehicle 10 (acceleration and/or braking and/or steering) based on localization sensor information. Manoeuvre planning may comprise applying cost/reward functions associated with obstacle avoidance and journey requirements, etc., based on the localization sensor information. The at least one localization sensor 406 may comprise on-board external-facing vision systems (e.g. camera, lidar, radar) for imaging an environment around the vehicle 10 up to a specified range (e.g. 50-500 m) and with a certain field of view (e.g. 360 degrees). Additionally or alternatively, the at least one localization sensor 406 may comprise an interface for vehicle-to-vehicle (V2V) or vehicle-to-infrastructure (V2I) communication. Additionally or alternatively, the at least one localization sensor 406 may comprise high-definition mapping information such as a 3D map (includes gradient changes).

At least one wheel sensor. Wheel sensors provide an indication of suspension state with respect to specific vehicle wheels. Wheel sensors include: wheel-to-body displacement sensors 404 for sensing suspension compression/extension (indicative of force); wheel position sensors; wheel hub accelerometers; etc.

At least one user interface 412. The illustrated user interface 412 is an onboard user interface, i.e. an occupant interface. The cabin 300 may comprise a human-machine interface to provide the occupant interface. The occupant interface may comprise an ingress/egress request button for requesting an autonomous vehicle 10 to stop and drop-off the user. The occupant interface may comprise a door open/close button. The occupant interface may comprise a touch screen display/voice interface for receiving user-dependent information such as preferences and/or journey requirements. In some examples, the at least one user interface 412 may be configured to interface with a user device such as a smartphone, wherein the user device comprises a human-machine interface for at least one of the above functions.

The term 'user' as described herein refers to a current, potential or prior occupant (passenger) of the vehicle 10.

In an example use case, the above system 400 enables a user to input journey requirements such as a destination (egress location) and optionally a pickup location (ingress location). A control system may be configured to generate a user-dependent route that satisfies the journey requirements. The route and any ingress/egress locations are therefore configurable to define an ad-hoc shared mobility vehicle 10 (e.g. autonomous taxi).

Various methods of using the active suspension 402 are described below.

Figure 5:
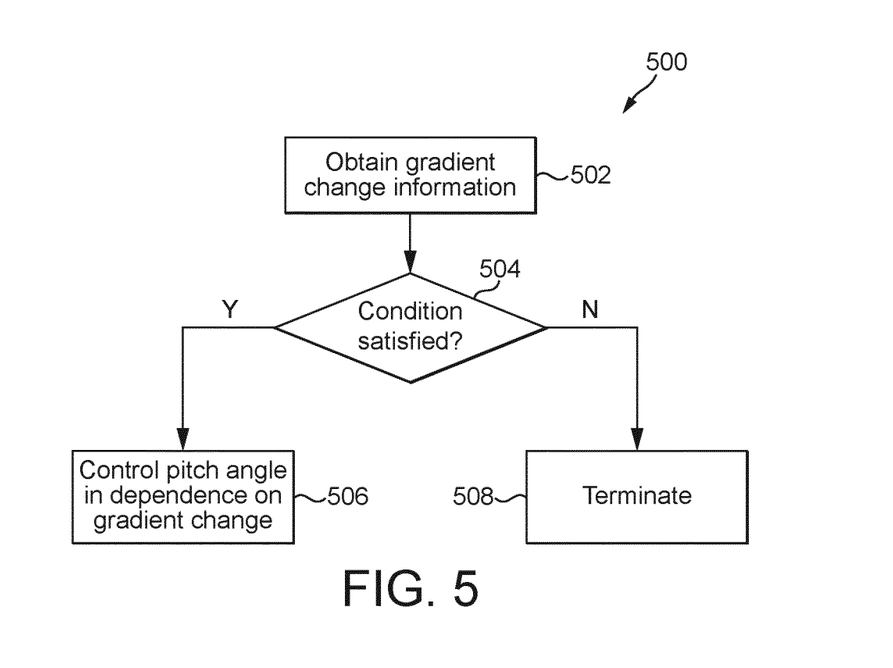
FIG. 5 illustrates an example of a control method.

FIG. 5 illustrates a control method 500 that controls the active suspension 402 to improve occupant comfort and/or visibility of occupants/sensors. The method 500 comprises:
  obtaining information indicative of a change of gradient of a driving surface in a direction of travel (block 502);
  optionally, determining whether or not a condition is satisfied (block 504); and
  controlling the active suspension 402 to control relative ride height between a front and rear of a vehicle body 302 of the vehicle 10 above the driving surface beneath the vehicle 10 in dependence on the change of gradient (block 506), if the optional condition is satisfied.

The information of block 502 will be explained in further detail. The information is obtained (received or determined) by the control system 2 and it indicates at least one change of gradient of the driving surface in the direction of travel of the vehicle 10.

A change of gradient in the direction of travel is a gradient which is parallel to/coaxial with the vehicle+x axis, or parallel to/coaxial with a longitudinal axis of a road lane of the driving surface which the vehicle 10 may be driving along. Therefore, the information of block 502 provides an indication of detected or expected pitch-axis rotations of the vehicle 10 about its y-axis (FIG. 1).

The method 500 may be reactive, predictive, or a combination thereof. Therefore, for reactive control, the information of block 502 may comprise feedback indicative of a detected change of gradient. For predictive control, the information may comprise feedforward indicative of an expected change of gradient. In some implementations, the feedforward may be provided to the reactive control to improve control performance.

For reactive control, information indicative of a detected change of gradient may measure the effect of a changing gradient on the vehicle's pitch angle. An example implementation comprises basing the information on measurements from at least one accelerometer and/or other sensor on the vehicle 10. Optionally, the accelerometer(s) may measure accelerations of the unsprung portions of the vehicle 10, as opposed to accelerations of the vehicle body 302, for a more reliable estimation of driving surface gradient. For example, the accelerometer may comprise a wheel hub accelerometer(s).

The change of gradient may be expressed in various ways. For example, a first (e.g. current) value of the gradient of the driving surface at a reference location (e.g. beneath the vehicle 10 for reactive control, or ahead for predictive) is received at a first time. The first value may be taken as a reference angle (e.g. zero). A second value of the gradient may be taken at a second later time. The second value may be compared with the first value, and the information may be dependent on the difference between the first and second values. The information may indicate the value of the difference. The information may indicate whether the difference is a positive (+z, upwards) or negative (−z, downwards) change. The information may indicate the rate of change of gradient, e.g. radians per second.

If the expected gradient is measured, the information may be based on measurements from at least one of the localization sensor(s) 406. The measurements may provide an indication of a change of gradient ahead of the vehicle 10 (ahead of a bumper or other front-most face or leading edge of the vehicle 10).

It would be appreciated that various types of sensors are capable of indicating changes of gradient. The information may be any information that varies when the gradient of a driving surface in the direction of travel of the vehicle changes.

The term 'change of gradient' covers not only discrete changes of gradient but also continuously changing gradients.

Once the information has been received at block 502, the method 500 proceeds to optional decision block 504 which determines whether to perform block 506 or not, i.e. whether a condition requiring something more/other than detection of the change of gradient is satisfied. If the condition is satisfied, block 506 is performed. If the condition is not satisfied, the method 500 terminates and reverts to 'normal' control of the active suspension 402. The specific checks necessary for satisfying the condition 504 depend on implementation, and will be described in full later.

When block 506 is performed, the control system 2 outputs a control signal that controls, at least in part, the active suspension 402. The control signal may comprise force demands such as the spring force demands and/or damping force demands and/or active force demands, for example. Changing the force demands differently for the front and rear active springs will affect the pitch angle of the vehicle body 302 relative to the prevailing driving surface. The prevailing driving surface is the surface upon which the vehicle is standing as any given moment during travel or at rest.

The output control signal may be one of several control signals sent by various skyhook/groundhook/pitch/heave (etc.) active suspension controllers for arbitration as described earlier. Alternatively, the output control signal may be the only control signal (non-arbitrated). In some examples, an output signal may be transmitted to the user interface 412, causing the user interface 412 to present to an occupant(s) information regarding the control of the active suspension. The presented information may be configured to provide an alert. The alert may be dependent on the capability of the active suspension to perform the required control. The capability may be affected by a proximity of displacement of the active suspension to a suspension travel limit and/or by the rate of change of gradient of the driving surface. Therefore, if the active suspension cannot fully improve comfort or preserve visibility, the alert may help occupants to prepare.

FIGS. 6(a) to (e) illustrate the effect of applying the active suspension control of block 506 of the method 500 for improving comfort on different slopes, according to various, but not necessarily all embodiments of the invention.

FIG. 6(a) shows a transition to an up-slope, e.g. from level ground. The change of gradient is positive. FIG. 6(b) shows a constant up-slope with no transition. FIG. 6(c) shows a transition to a plateau after an up-slope. The change of gradient is negative. FIG. 6(d) is a crest transitioning from an up-slope to a down-slope. The change of gradient is negative. FIG. 6(e) is a transition from a down-slope, e.g. to level ground. The change of gradient is positive. A dip is not shown but would comprise a transition from a down-slope to an up-slope.

In response to receiving the information indicative of one or more of the transitions such as the ones shown in FIGS. 6(a), (c), (d) and (e), the pitch angle of the vehicle body 302 is controlled based on the change of gradient.

There are at least three control schemes for controlling the pitch angle: Angle Control; Rate Control; or a combination of both, and the method 500 may use at least one of these control schemes. Angle Control and Rate Control are described below.

Angle Control will be explained first. Angle Control maintains a desired angular position of the vehicle body 302 in the pitch (y) axis, and may be implemented using a PI/PID control scheme or the like.

Angle Control comprises obtaining a target adjustment for causing a deviation of pitch angle between the vehicle body 302 and an angle of the driving surface beneath the vehicle 10. The deviation may arise from: changing the vehicle pitch angle; or inhibiting a gradient-induced change of the vehicle pitch angle (holding a pitch angle); or a combination of the two. The target may be a force demand target, for example.

Adjustment refers to changing the target from a first 'standard' value of the target that maintains a standard rake angle of the vehicle 10 relative to the driving surface, to a second adjusted target value. A rake angle refers to the reference/default pitch angle of the vehicle body 302 relative to the driving surface. Most cars have a standard slightly-positive rake angle, wherein the front ride height of the vehicle is slightly less than the rear ride height. For the purposes of simplicity, the standard rake angle will be described as substantially parallel to the driving surface.

In an example implementation, the target is adjusted to vary the control output (e.g. force demands) to cause the vehicle body pitch angle to be adjusted to/maintained at an angle corresponding to a horizontal horizon. The horizontal horizon is slope invariant. The horizontal horizon may be known via the IMU 408 or other accelerometer on the vehicle 10. The horizontal horizon forms a target/setpoint.

FIG. 6(a) shows the vehicle body 302 of the vehicle 10 remaining horizontal to the horizon as it enters the up-slope from a horizontal/level driving surface. Since the change of gradient is positive, the adjusted target may cause the active suspension 402 to raise the rear and/or lower the front of the vehicle body 302. FIG. 6(a) shows the rear of the vehicle 10 rising due to the adjusted target.

Advantageously, the front active springs may be naturally compressed by the external inertial forces of entering the up-slope, and the control system 2 may only need to apply any additional force demand required to reach the setpoint, with corresponding reduced energy consumption.

The control system 2 may inhibit rebound of the front active springs (e.g. via force demands) to maintain the front active springs in their compressed state.

Raising the rear may be achieved by increasing rear active force demand. As the front rises due to the slope, the rear may be raised correspondingly, e.g. by consuming vehicle energy, to ensure that the vehicle pitch angle remains on-target.

If predictive control is available, feedforward information could be provided. In one example, feedforward information may improve reactive control performance. In another example, the feedforward information enables the change of pitch angle to commence a short time before the vehicle 10 reaches the change of gradient, for example before the change would otherwise be detected by wheel hub accelerometers.

In FIG. 6(b), the vehicle 10 is on an up-slope, for example after the transition of FIG. 6(a). In FIG. 6(b), the vehicle body 302 has returned to the first (standard) slope-parallel pitch angle. This return marks the end of block 506 and the method 500. Returning to the standard pitch angle ensures that the vehicle dynamics are predictable to occupants, that the vehicle 10 has good visibility along the driving surface, and that the vehicle body 302 will require less pitch adjustment if the next transition is a negative gradient change.

Returning to the first pitch angle may comprise enabling the pitch angle to commence returning towards the angle of the driving surface beneath the vehicle 10. Enabling the pitch angle to commence returning may comprise unwinding the target from the second, adjusted value (e.g. horizontal horizon) towards a first, standard value. The vehicle pitch angle will therefore migrate back towards a standard rake angle substantially parallel to the driving surface.

Rate Control will now be explained, with reference to FIG. 6(b). Rate Control controls variation of angular position of the vehicle body 302 in the pitch (y) axis, and may be implemented using a PI/PID control scheme or the like.

The control system 2 may implement a Rate Control function in various ways. For example, Rate Control may link to Angle Control. One method is to saturate the control signal output (e.g. force demands) associated with the Angle Control, to reduce the ability of the Angle Control to minimise a measured error between the vehicle body pitch angle and a target. Another method is to control the rate at which the Angle Control target is returned from the second adjusted value to the first standard value.

The controlled rate of change of pitch angle may be less than a comfort threshold. The rate may be dependent on a measured variable such as a measured vehicle dynamic parameter. For example, the rate may be vehicle speed-dependent. The rate may be higher for greater vehicle speeds, because the next gradient change may be reached sooner.

The pitch angle may start unwinding from the adjusted value after the vehicle has driven through the transition. The rate of unwinding may be calculated based on the maximum acceptable rate of change of pitch angle for comfort and the relative pitch angle between the body and the driving surface at the transition exit.

An advantage of the Rate Control is that the period of time over which the vehicle body pitch angle changes can be lengthened, compared to the situation in which Rate Control is not used. Therefore, the peak rate of change of pitch angle with respect to time has been reduced, so occupant discomfort and head toss are reduced.

Referring now to FIG. 6(c), the vehicle 10 is reaching a plateau transitioning from the up-slope to a level or less inclined surface. Unlike FIG. 6(a), the change of gradient is now negative rather than positive. The control of the vehicle 10 may be similar to FIG. 6(a), or different if positive and negative changes are treated differently.

There may be an advantage to treating positive and negative changes differently. Experimentation revealed that some occupants may be less comfortable with the vehicle 10 targeting a horizontal horizon if the change of gradient is negative, than if the change of gradient is positive. Identifying the specific cause is outside the scope of this work.

Figure 7:
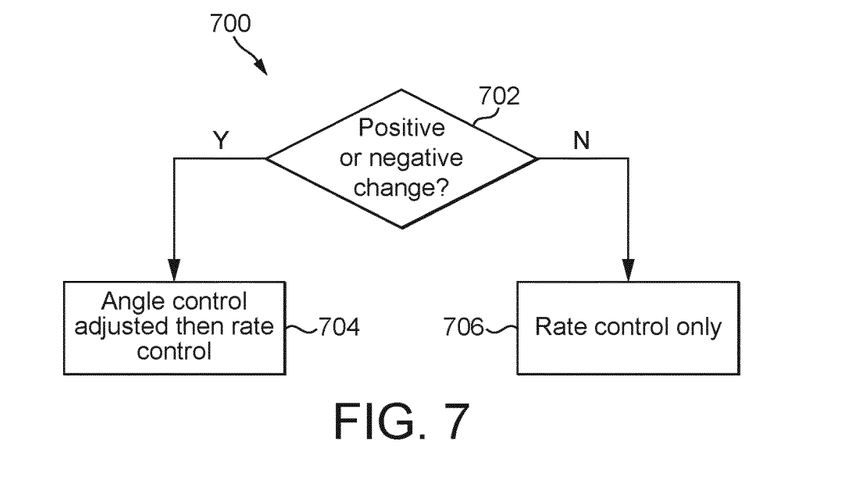
FIG. 7 illustrates an example of a control method.

FIG. 7 provides an example method 700 for controlling the vehicle 10 differently in dependence on whether the gradient change is positive or negative.

At block 702, the method 700 comprises determining whether the change of gradient is positive or negative relative to a reference, based on an indication such as the information of block 502.

The reference may be the reference angle (previous angle) as described earlier, wherein a positive change is a positive change of gradient, and a negative change is a negative change of gradient.

If the change of gradient is positive, the method 700 proceeds to block 704. If the change of gradient is negative, the method 700 proceeds to block 706. Blocks 704 and 706 are two different implementations of block 506 of the method 500 of FIG. 5.

In the example method 700, but not necessarily all examples, block 704 differs from block 706 in the following way. Block 704 comprises performing at least Angle Control (e.g. target horizontal horizon) and optionally Rate Control as well. Block 706 however does not perform Angle Control in the sense that the target pitch angle is not adjusted from its standard value, and may perform Rate Control only.

The effect of performing Rate Control without Angle Control is explained with reference to FIG. 6(*c*).

Figure 6:
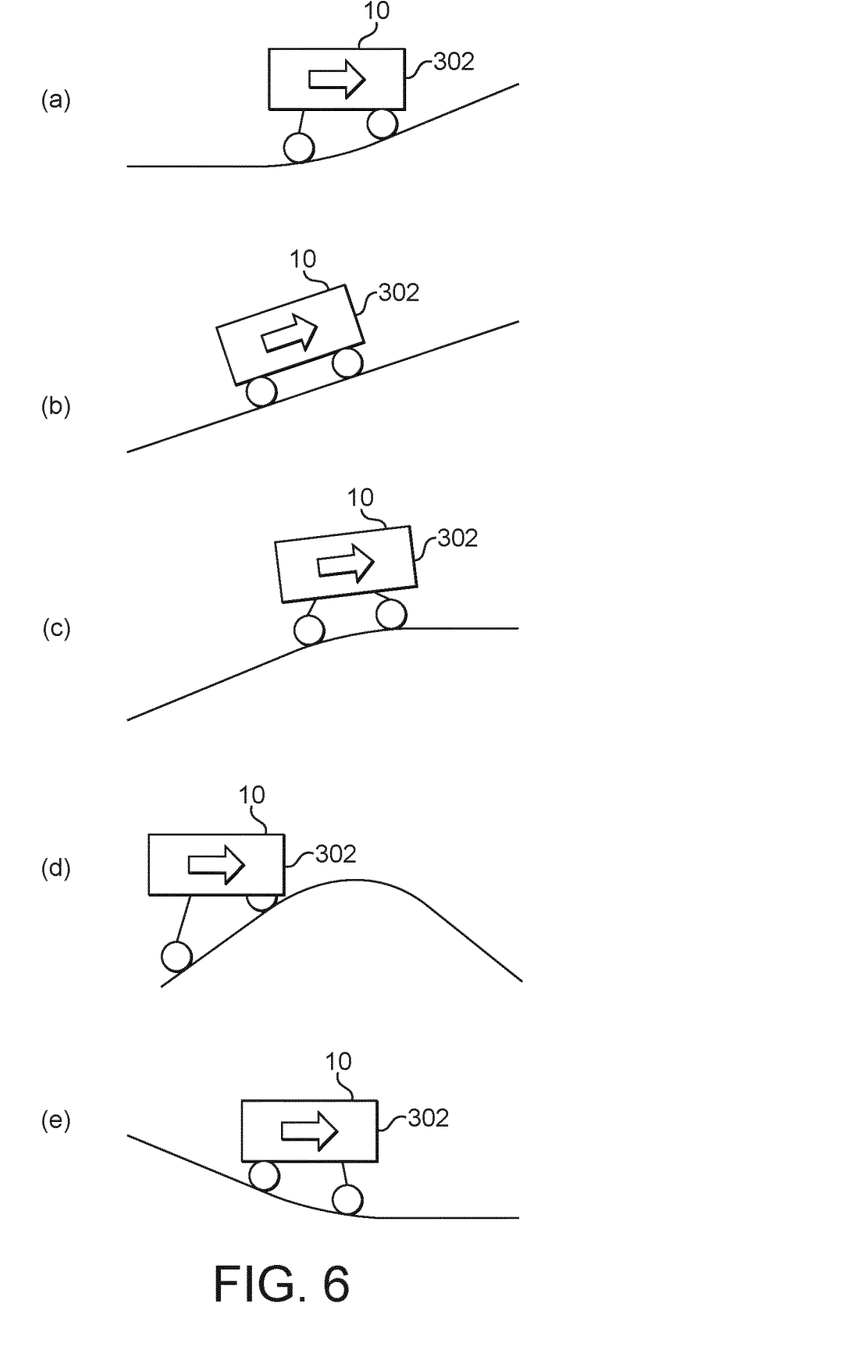
FIGS. 6(a) to (e) illustrate the effect of controlling pitch angle of a vehicle body on different slope changes, for improved comfort.

In FIG. 6(*c*), the front and/or rear of the car is shown to naturally heave upwards due to the inertial forces caused by the negative change of gradient. The pitch angle will also naturally change due to the wheelbase of the vehicle 10. The target (e.g. force demands) has not been adjusted from the first, standard value because Angle Control (target adjustment) is not performed. Therefore, the active suspension 402 will continuously attempt to reduce the difference between the pitch angle of the vehicle and the angle of the driving surface, before, during, and after the transition.

However, the Rate Control may control/limit the rate at which the pitch angle returns to driving surface-parallel. As explained earlier, this means that comfort is improved and head toss is reduced.

FIG. 6(*d*) shows the vehicle 10 approaching a crest. A crest comprises the gradient changing from positive relative to the horizontal horizon, to negative relative to the horizontal horizon. The change of gradient is negative. The active suspension 402 may therefore be controlled in a similar way to FIG. 6(*c*) and based on the method 700. Alternatively, the active suspension 402 could optionally be controlled in a specific way if the gradient change is a crest—this will be described later.

FIG. 6(*e*) shows the vehicle 10 on a negative slope (with respect to the horizontal horizon), transitioning to level ground via a transition. The transition is a positive gradient change. Therefore, the vehicle 10 may be controlled similarly to FIG. 6(*a*).

Note that because the vehicle 10 is starting from a down-slope in FIG. 6(*e*), targeting a horizontal horizon will in this case raise the front and/or lower the rear, whereas in FIG. 6(*a*) targeting a horizontal horizon will lower the front and/or raise the rear. A second benefit is that visibility of the driving surface ahead is improved.

The examples of FIGS. 6(*a*) to (*e*) are not an exhaustive set of use cases, nor is every one of the use cases essential. The illustrated use cases merely demonstrate various non-limiting examples of how the invention could be implemented.

The following paragraphs below describe situations in which one or more aspects of the method(s) 500, 700 may be inhibited.

Available time to perform the method may be an inhibiting factor. Satisfaction of the condition 504 may require at least an available time requirement to be satisfied. The available time requirement may be satisfied when there is sufficient time to complete block 506, before a subsequent manoeuvre. For example, the available time requirement may be satisfied when there is sufficient time to adjust the target and then return the target to the standard value, before a subsequent manoeuvre. The subsequent manoeuvre may comprise the vehicle 10 reaching a second (subsequent) change of gradient and needing to repeat the method 500 again.

In some examples, satisfaction of the available time requirement may be dependent on an indication of a length (distance) of the driving surface between two changes of gradient. For example, the positions of changes of gradient may be determined, and the length of the driving surface between the changes may be determined. The changes of gradient may be above-threshold changes. The length indication may be obtained based on measurements from at least one of the localization sensor(s) 406, for example. In some examples, the indication may be obtained based on data from previous journeys, vehicle-to-vehicle communication, vehicle-to-infrastructure communication, or any other suitable technology.

Additionally, satisfaction of the available time requirement may be dependent on the speed of the vehicle 10 associated with the change of gradient. The speed may be the current speed of the vehicle 10 or the estimated/planned future speed of the vehicle 10 travelling along the length of driving surface between the changes of gradient.

Based on the length and the speed of the vehicle 10, the available time requirement can determine a time available for performing block 506. If the available time is above a threshold, the available time requirement is satisfied. The value of the threshold depends on implementation.

In some, but not necessarily all examples, satisfaction of the condition 504 may be based on vehicle speed alone or based on the length alone. For example, the vehicle 10 may need to be travelling at a predetermined minimum speed. The length may need to be a minimum value. The condition may filter out small-scale gradient changes such as kerbs and speed bumps.

In some, but not necessarily all examples, satisfaction of the condition 504 may require a spatial rate of change of the gradient of the detected change of gradient to be above a threshold. The value of the threshold depends on implementation.

In some, but not necessarily all examples, satisfaction of the condition 504 or behaviour of the Angle Control and/or Rate Control may depend on other inhibiting factors, examples of which are provided below:

- A ground clearance requirement. This reduces the likelihood of contact between the underside of the vehicle body 302 and rutted ground or low obstacles as a result of performing the method 500. Checking the ground clearance requirement may be performed using sensors to detect rough ground and/or obstacles, such as the localization sensor(s) 406, and/or other terrain sensors such as sensors that respond to rough ground. Additionally or alternatively, vehicle subsystems may be configurable in various driving modes (e.g. on-road/off-road modes), at least one of which (off-road) may be associated with rough ground. The angle may be restricted.
- An external cargo requirement, associated with cargo attached to the vehicle body 302 and external to the vehicle body 302. If the external cargo is a towed object such as a trailer, the angle of a trailer, which depends on vehicle pitch angle, may need to be kept within tightly defined limits. If the external cargo is a roof box, roof clearance may be affected that could make raising part of the ride height less desirable. Internal sensitive cargo is less problematic, and may in fact benefit from the reduced cabin motions associated with gradient changes. Checking the towing requirement may be performed via a signal from a towing detection system. Towing may be detected via sensing (e.g. rear-facing localization sensor 406: camera), or an electrical signal transmitted in response to connection of a hitching subsystem. Checking roof cargo may comprise employing a roof mass estimator that assesses actual vs expected vehicle body motion, e.g. via inertial measurements, or receiving user input indicative that roof cargo is fitted.

An ingress/egress requirement, associated with the vehicle 10 stopping for ingress/egress. This ensures that the method 500 does not interfere with access to the vehicle 10. The vehicle 10 may optionally comprise a kneeling function for ingress/egress. The method 500 may require the vehicle 10 to be moving, therefore checking the requirement may comprise determining whether the vehicle 10 is stopping, and/or whether an ingress/egress request is received.

A vertical clearance requirement, associated with a vertical distance of a bottom of an external object above the top (such as a roof) of the vehicle 10. Relevant use cases include the vehicle 10 entering a covered car park with limited vertical clearance, or driving under a low-height bridge. Localization sensors 406 such as cameras may recognise clearance restriction signs via a sign recognition algorithm, for example. Roof cargo (see above) may be taken into account.

A manual setting requirement. An authorised user may be able to configure or disable the method 500.

The above list of requirements are examples of requirements that may cause the control system 2 to perform one or more of the following:

cause the condition 504 to not be satisfied—i.e. terminate method 500; or reduce target adjustment (e.g. farther from horizontal horizon) in Angle Control; and/or reduce rate limit (e.g. slower return to standard pitch angle) in Rate Control; and/or inhibit raising of the ride height; and/or inhibit lowering of the ride height.

FIG. 6(*a*) to FIG. 7 represent implementations of the method 500 of FIG. 5 that primarily improve occupant comfort, with some potential visibility benefits too; however, the method 500 of FIG. 5 could be implemented in a slightly different or enhanced way to primarily improve visibility or exclusively improve visibility. Examples of visibility-improving implementations and features are described below in relation to FIGS. 8 to 10.

Figure 8:
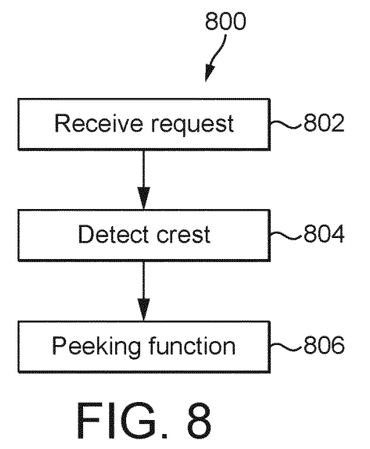
FIG. 8 illustrates an example of a control method.

FIG. 8 represents a method 800 that improves visibility by causing the vehicle 10 to peek over negative changes of gradient, and particularly over uphill-to-downhill transitions such as crests.

At block 802, the improved-visibility method 800 comprises receiving a request to modify relative ride height between the front and rear of the vehicle body 302, in other words to change the pitch angle of the vehicle body 302.

The request may come from a user. The user request may be via a human-machine interface (HMI) 412 associated with the vehicle 10. The user may desire to raise the vehicle 10 to peek over a crest.

In some examples, the request may be automatically generated in response to change of a mode (e.g. driving mode) of the vehicle 10 to one of a plurality of modes, wherein different ones of the plurality of modes configure one or more vehicle subsystems differently.

Examples of different modes include: a comfort mode; and an improved visibility mode. In the comfort mode, the features described above in relation to FIGS. 6(*a*) to 7 may be provided. If the mode is changed to an improved visibility mode, the active suspension 402 may be controlled differently.

The mode change may occur automatically or in response to a user selection via HMI 412. An automatic mode change may be triggered by detecting vehicle occupancy information using cabin sensors 410, for example comfort mode may be deactivated when the vehicle is travelling empty (in autonomous mode), to save energy, and the improved visibility mode may be selected to provide a relative energy saving.

The vehicle subsystem(s) controlled by the modes includes the part of the control system 2 that is associated with active suspension control, as described herein. Other vehicle subsystems associated with non-suspension control may optionally be configured by the modes too.

The method 800 proceeds to optional block 804, for example if the new mode is the improved visibility mode. Optional block 804 is performed if the control system 2 is capable of automatically detecting when the pitch angle change is required. If operation is manual, then block 804 may be skipped and the active suspension 402 may be controlled manually via the HMI.

Block 804 comprises obtaining an indication that a change of gradient condition is satisfied. Satisfaction of the change of gradient condition may require a detected gradient change having predetermined characteristics. The detected gradient change may be ahead of the vehicle 10 for predictive control, or under the vehicle for reactive control. In an implementation, the gradient may need to be a crest or some other above-threshold negative change of gradient.

The crest may be detected by a crest detection system, to satisfy the change of gradient condition. The condition is satisfied when the crest detection system detects a crest in the path of the vehicle 10. The crest detection system functionality may be implemented in the control system 2 or a separate controller in communication with the control system 2.

An example implementation of a crest detection system comprises a system that detects the topography of an area ahead of the vehicle 10, for example via a 3D point cloud derived from localization sensor measurements, and detects a discontinuity in terrain along the predicted path of the vehicle 10. The predicted path of the vehicle 10 may be the x-axis of the vehicle 10, or dictated by an autonomous vehicle controller during autonomous driving. The crest detection system may obtain information indicative of the slope of terrain before the discontinuity, for example from the 3D point cloud.

The discontinuity may correspond to a boundary between terrain and a region in which terrain would be expected to be present (due to being within a range of detection of the terrain data capture means) but is absent, for example due to shadowing of terrain by a crest.

The crest detection system may also determine whether the slope information before the discontinuity indicates that a value of slope of terrain before the discontinuity over a predetermined distance exceeds a predetermined threshold in an upwardly-inclined direction (+z).

Detection of a crest may therefore require both detection of the discontinuity and of the above-threshold upward slope ahead of the discontinuity.

When the change of gradient condition is satisfied, the method 800 proceeds to block 806 which comprises controlling the active suspension 402 to provide the peeking function. Providing the peeking function comprises modifying the pitch angle in response to the request (and in response to satisfaction of the change of gradient condition, if automatic). Modifying the pitch angle comprises: lowering the front of the vehicle body 302; or raising the rear of the vehicle body 302; or raising the front and the rear of the vehicle body 302 by different distances.

For peeking automatically using reactive control, the pitch modification may be performed when the vehicle 10 is at the point of cresting, by detecting, e.g. via the wheel sensors or localization sensors, whether the front wheels are on a more negative gradient than the rear wheels (the rear wheels could still be on the up-slope, or on level ground). At this point of cresting, the view of the driving surface ahead of the vehicle may normally be obscured by the bonnet if the driving surface angle after the crest is steep relative to the driving surface angle at/before the crest, however the peeking tilts the vehicle forward to enable a line of sight of the driving surface.

For peeking automatically using predictive control, the pitch modification may be capable of being performed just before the vehicle 10 has crested, corresponding to the front wheels not yet being on a negative gradient, e.g. on the up-slope or on the level ground of the crest.

The pitch angle may be modified while the vehicle 10 is moving, or the pitch angle may be modified only after the vehicle speed has dropped below a threshold, for example requiring the vehicle 10 to come to a halt. If manual, the functionality may be enabled if the vehicle speed is below the threshold (e.g. at a halt).

Figure 9:
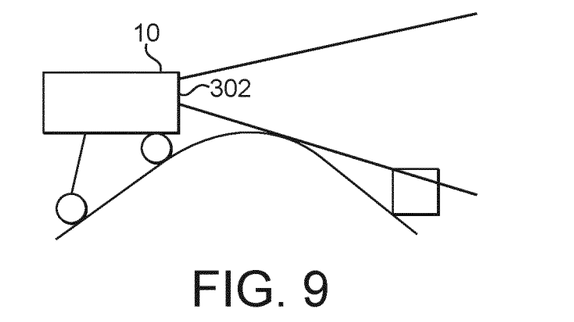
FIG. 9 illustrates the effect of controlling pitch angle of a vehicle body for improved visibility over a crest.

FIG. 9 shows an example of raising the rear of the vehicle body 302 just before cresting. By raising the rear of the vehicle body 302, the down-slope past the crest is less likely to be obscured by a bonnet (or other part of the vehicle body 302) of the vehicle 10, and the overall seat position of the vehicle occupant above the ground may be slightly higher. As a result, obstacles on the down-slope side of the crest are now visible. If the vehicle moves forward slightly with this pitch angle, the occupants/sensors will soon see the driving surface/road of the down-slope.

Although in FIG. 8 block 804 occurs in response to block 802, in other examples block 802 may be performed in response to block 804. In other words, the control system 2 may: detect the crest; broadcast/transmit information indicative that a crest has been detected to another controller/HMI; and receive the request for peek mode from the other controller/HMI in response to transmitting the information.

Figure 10:
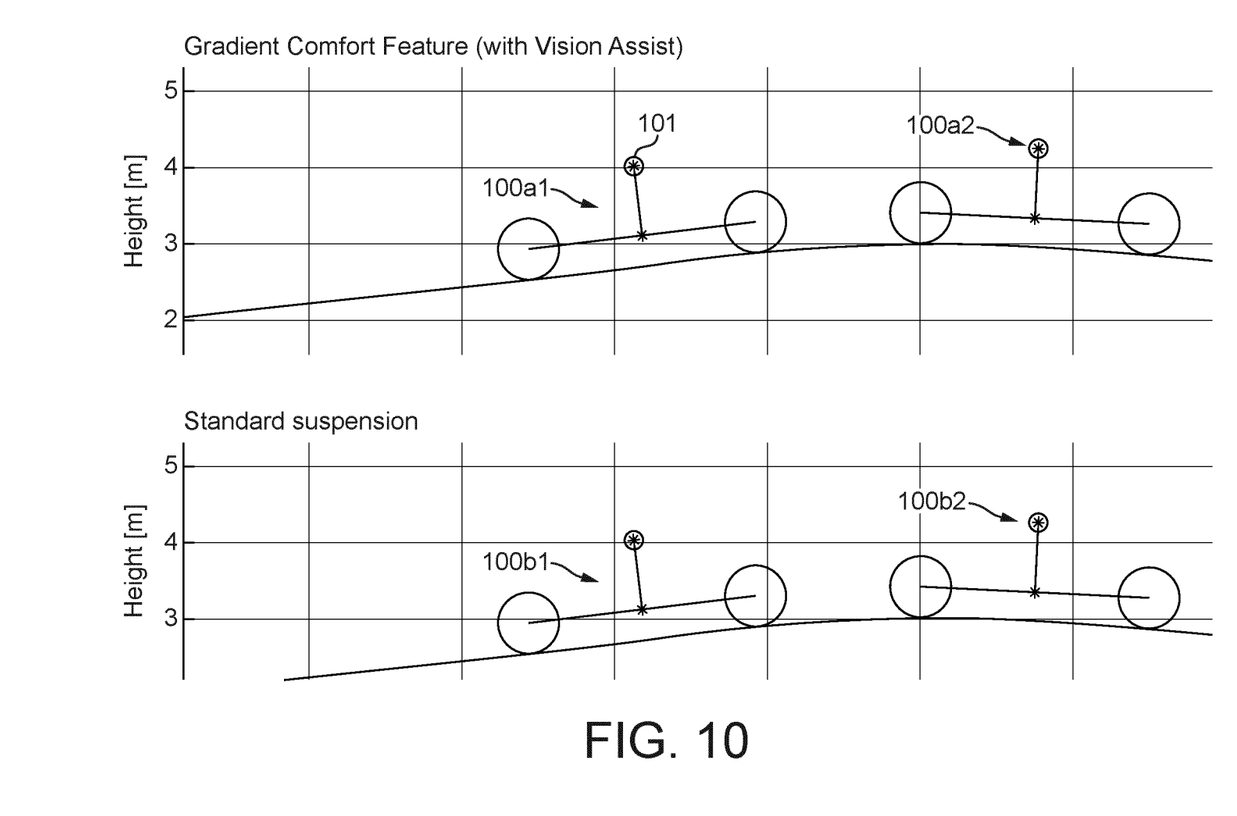
FIG. 10 illustrates the effect of controlling pitch angle of a vehicle for improved comfort and visibility over a crest; compared to a situation in which the vehicle is controlled in a standard manner.

FIG. 10 shows an upper graph illustrating the results of a simulation that provides both a comfort-improvement and a visibility-improvement. The vehicle 10 with improved suspension control is represented at a first time 100a1 before cresting (transitioning from uphill to downhill) and at a second time 100a2 shortly after cresting.

The lower graph of FIG. 10 illustrates the results for standard suspension control, targeting a driving surface-parallel pitch angle. The vehicle 10 with standard suspension control is represented at the first time 100b1 before cresting (transitioning from uphill to downhill) and at a second time 100b2 shortly after cresting.

The improved suspension control of FIG. 10 uses reactive control, with feedforward information, and adopts Angle Control (adjusted target angle is now substantially parallel to horizontal horizon) and Rate Control. The Angle Control causes at least the rear ride height to rise. The front ride height also lowers, to provide a platform that is substantially parallel to a horizontal horizon, to improve comfort. The down-slope side of the crest is now less likely to be obscured by a bonnet of the vehicle 10.

FIG. 10 illustrates a marker 101 indicative of the position of an occupant's head (circle), and the star inside the circle is positionally fixed to the vehicle body. The relative positioning of the star and the circle indicate head accelerations (head toss) of the occupant. When the star is inside the circle, the occupant is not experiencing head toss. When the star is outside the circle, the occupant is experiencing head toss.

With standard suspension control, the occupant encounters substantial peak head toss over the crest, as shown by the star leaving the circle at 100b2. With the improved suspension control, the occupant encounters far-reduced peak head toss at 100a2.

Note that the method 700 of FIG. 7 has not been used for FIG. 10, to enable Angle Control to be performed over the crest which is a type of negative gradient change. A detected crest may define a special condition in which Angle Control may at least occasionally be used for negative gradient changes.

The visibility-improving methods of FIGS. 8-10 may optionally be inhibited/forbidden based on any one or more of the above-described factors that inhibit the comfort-improving methods (e.g. towing, external cargo, etc).

From the preceding description, it would be appreciated that a vehicle's ability to change pitch is limited by available suspension travel. For Angle Control on steeper slopes, the suspension may hit a suspension travel limit (e.g. bump stops) before the pitch angle is parallel to the horizontal horizon. The displacement of the active suspension 402 relative to the suspension travel limits may be detectable using wheel-to-body displacement sensors 404 or the like. The control system may account for the available suspension travel limits, by saturating the output (e.g. force demand) of the control system or the final arbitrated force demand that is supplied to the active suspension actuator (e.g. pump). The saturation may ensure that the force requested does not overcome the predetermined spring force at the predetermined suspension travel limit. Beneficially, the saturation may ensure that the force requested is within a predetermined proximity to the spring force at the travel limit (but not equal), to allow some extra suspension travel for shock absorption.

It would be appreciated that one or more of the functions described above may be configured to operate when the vehicle's direction of travel is the reverse of the above-described direction of travel. When reversing over a crest, the front of the vehicle may be raised and the rear may be lowered, to improve visibility by enabling peeking over the crest. The control system 2 may determine whether the direction of travel is set to 'forward' or 'reverse', and modify the active suspension control methods accordingly when the direction changes.

For purposes of this disclosure, it is to be understood that the controller(s) described herein can each comprise a control unit or computational device having one or more electronic processors. A vehicle 10 and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in the FIGS. 5, 7 and 8 may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

The invention claimed is:

1. A control system for controlling an active suspension of a vehicle, the control system comprising one or more controllers, the control system configured to:
   obtain information indicative of a change of gradient of a driving surface in a direction of travel;
   obtain a target adjustment for causing a deviation of pitch angle between the vehicle body and an angle of the driving surface beneath the vehicle; and
   control the active suspension to control relative ride height between a front and rear of a vehicle body of the vehicle above the driving surface beneath the vehicle in dependence on the change of gradient, wherein the control of relative ride height between the front and rear of the vehicle body is towards the target adjustment.

2. The control system of claim 1, wherein the control system is configured to commence the control of the relative ride height between the front and rear of the vehicle body towards the target adjustment before the vehicle reaches the change of gradient.

3. The control system of claim 1, wherein the control system is configured to control the relative ride height towards the target adjustment during travel of the vehicle over the change of gradient.

4. The control system of claim 1, wherein the control of relative ride height comprises controlling a rate at which the relative ride height between the front and rear of the vehicle body changes towards the angle of the driving surface beneath the vehicle.

5. The control system of claim 1, configured to obtain an indication of a length of the driving surface after the change of gradient and before a second change of gradient, and determine whether or not to perform the control of the active suspension, in dependence on at least the length.

6. The control system of claim 5, configured to obtain an indication of a speed of the vehicle associated with the change of gradient, and wherein the determination of whether or not to perform the control of the active suspension is dependent on the speed.

7. The control system of claim 1, configured to obtain an indication of whether the change of gradient is positive or negative relative to a reference, and wherein the control of relative ride height is dependent on whether the change of gradient is positive or negative.

8. The control system of claim 1, wherein the control of relative ride height comprises:
   a) raising the rear and/or lowering the front of the vehicle body above the driving surface when the change is a positive change of gradient from a non-negative gradient; and/or
   b) lowering the rear and/or raising the front of the vehicle body above the driving surface when the change is a positive change of gradient from a negative gradient.

9. The control system of claim 1, configured to:
   receive a request to modify relative ride height between the front and rear of the vehicle body; and
   control the active suspension to modify the relative ride height in response to the request, comprising lowering the front of the vehicle body, or raising the rear of the vehicle body, or raising the front and the rear of the vehicle body by different distances.

10. The control system of claim 1, wherein:
    the control of relative ride height comprises raising the rear and/or lowering the front of the vehicle body when the direction of travel is a first direction of travel associated with the front of the vehicle body reaching the change of gradient of the driving surface before the rear of the vehicle body; and/or
    the control of relative ride height comprises lowering the rear and/or raising the front of the vehicle body when the direction of travel is a second direction of travel opposite the first direction of travel associated with the rear of the vehicle body reaching the change of gradient of the driving surface before the front of the vehicle body.

11. The control system of claim 1, configured to:
    obtain information indicative of a relative displacement between the active suspension and a suspension travel limit; and
    modify the control of the active suspension to inhibit further displacement of the active suspension towards the suspension travel limit, in dependence on the information indicative of the relative displacement.

12. The control system of claim 1, configured to:
    obtain information indicative of rough ground and/or an obstacle external to the vehicle; and
    inhibit the control of the active suspension in dependence on the information indicative of rough ground and/or the obstacle.

13. A vehicle comprising the control system of claim 1.

14. A method of controlling an active suspension of a vehicle, the method comprising:
    obtaining information indicative of a change of gradient of a driving surface in a direction of travel;
    obtaining a target adjustment for causing a deviation of pitch angle between the vehicle body and an angle of the driving surface beneath the vehicle; and controlling the active suspension to control relative ride height between a front and rear of a vehicle body of the vehicle above the driving surface beneath the vehicle in dependence on the change of gradient, wherein the control of relative ride height between the front and rear of the vehicle body is towards the target adjustment.

15. A non-transitory, computer-readable storage medium storing instructions thereon that, when executed by one or more electronic processors, causes the one or more electronic processors to carry out the method of claim 14.

\* \* \* \* \*